Patented Feb. 23, 1954

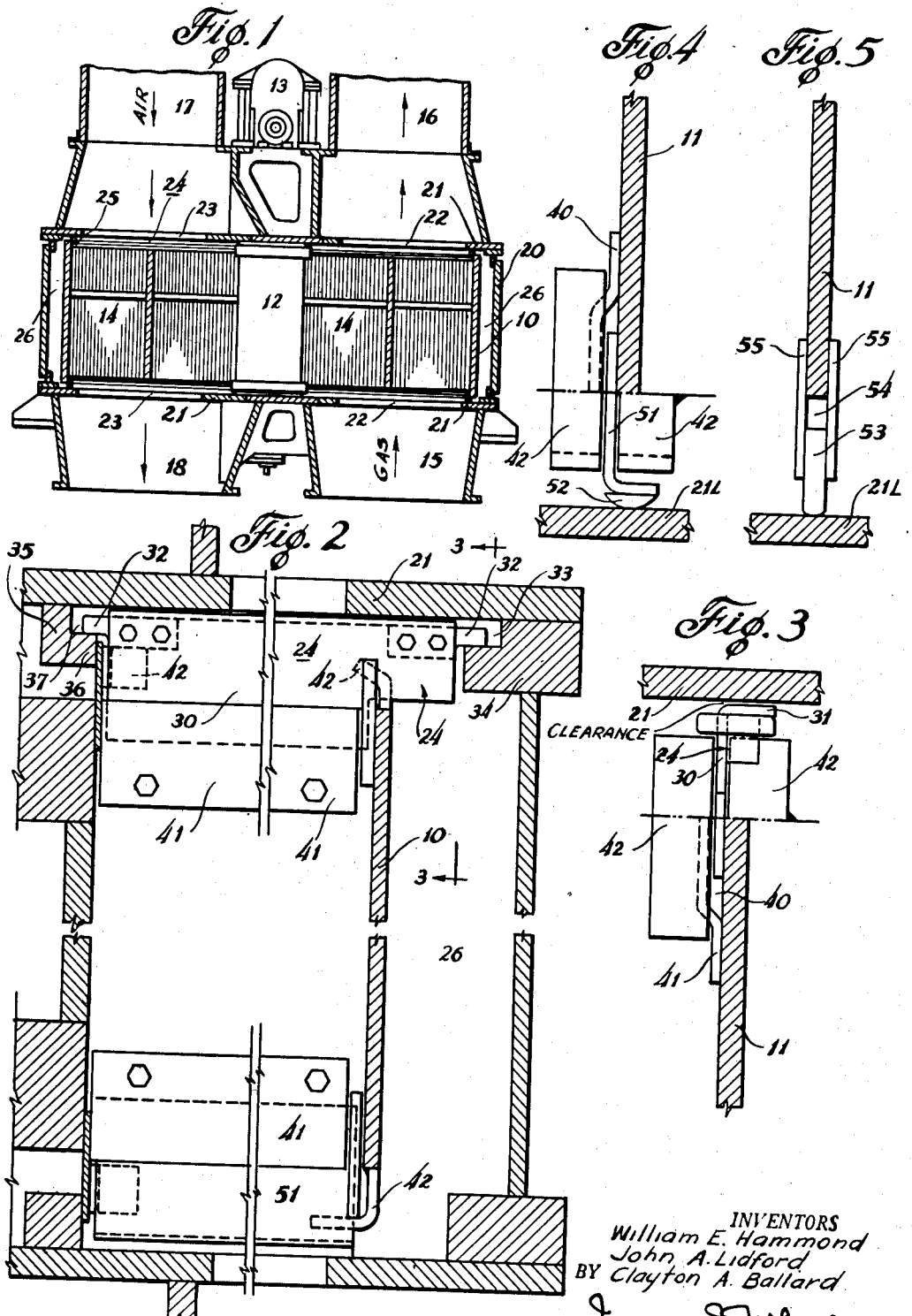

2,670,183

UNITED STATES PATENT OFFICE 2,670,183

FLOATING RADIAL SEAL FOR REGENERATIVE HEAT EXCHANGERS

William E. Hammond, Wellsville, John A. Lidford, Friendship, and Clayton A. Ballard, Belmont, N. Y., assignors to The Air Preheater Corporation, New York, N. Y.

Application October 12, 1950, Serial No. 189,759

2 Claims. (Cl. 257—6)

The present invention relates to improved radial seals for use between the rotor and the end plates of the housing enclosing a rotary regenerative air preheater or similar apparatus.

In a rotary regenerative heater of the Ljungstrom type a cylindrical rotor has compartments carrying heat transfer material which as the rotor turns is first exposed to heating gases and then disposed in the air passage to impart the absorbed heat to the air. The rotor is surrounded by a housing having end plates formed with openings to provide for the flow of gas and air. To prevent the mingling of the two fluids the partitions forming the rotor compartments are provided with radial seals that usually wipe against the imperforate portions of the end plates or vice versa.

The present invention contemplates constructing the provision of radial seals that are supported in fixed positions relatively to the end plates so as to contact the latter despite axial movement of the rotor due to expansion or contraction etc.

The invention will be best understood upon consideration of the following detailed description of illustrative embodiments thereof when read in conjunction with the accompanying drawings in which:

Figure 1 is a sectional elevational view in diagrammatic form of a rotary regenerative air preheater embodying the present invention.

Figure 2 is a broken away elevational view on an enlarged scale illustrating one of the radial seals carried by the partitions that form the rotor compartments carrying heat transfer plates in cooperative relation with the end plates.

Figure 3 is a view on an enlarged scale as viewed on line 3—3 in Figure 2 showing the mounting of a radial seal on a rotor partition.

Figures 4 and 5 are similar views of other forms taken by the radial seals.

In the drawings the numeral 10 designates the cylindrical shell of a rotor divided into sector shaped compartments by radial partitions 11 connecting it with the rotor post 12 which is driven by a motor and reduction gearing 13 to turn the rotor slowly about its axis. The rotor compartments contain regenerative heat transfer material in the form of closely spaced metallic plates 14 which first absorb heat from hot gases entering the preheater through a duct 15 from a boiler or other source to be discharged after passing over the heat transfer plates 14 through an outlet duct 16 to which an induced draft fan (not shown) is connected. As the rotor turns slowly about its axis, the heated plates 14 are moved into the stream of air admitted through the duct 17 to which a forced draft fan (not shown) is connected. After passing over the plates 14 and absorbing heat therefrom the stream of air is conveyed to the boiler furnace or other place of use through duct 18.

A housing 20 enclosing the rotor 10 is provided at either end opposite the latter with end or sector plates 21 which are apertured at 22 and 23 to admit and discharge streams of gas and air flowing through the preheater. In order that the streams of gas and air may not commingle, a portion of the rotor at least equal to but usually greater in circumferential extent than one rotor compartment must be isolated or blocked off between the gas and air passages. As illustrated, radial seals designated as a whole by the numeral 24 (Figs. 2 and 3) are provided in cooperative relation between the radial partitions 11 and the sector plates 21 whose imperforate portions between openings 22, 23 must be at least slightly greater than the width of the compartments in the rotor. In order that the streams of gas and air may not by-pass the heat transfer surface 14 by flowing in the annular clearance space 26 between the rotor shell 10 and the housing 20 it is customary to provide circumferential seals indicated diagrammatically at 25 on the shell 10 which wipe against the sector plates 21 or allied parts so as to seal off the space 26 at both ends of the rotor.

In accordance with the present invention the seals 24 extending radially of the partitions 11 are in the form of narrow plates 30 that project from the latter with their outer end portions bent over into flange form at 31 (Fig. 3) to lie parallel with the inner surface of the end plates 21. The flange of each upper radial seal is maintained separated from the upper end plate by a narrow clearance, the flange being close enough to have a sealing effect but not in actual wiping contact with the end plate. The lower seals however do contact and ride upon the end plate. At the inner and outer ends the sealing leaves 30 are provided with wear shoes 32 that extend into grooves 33, 37 and ride on tracks on adjacent parts of the housing above the rotor. As shown the groove 33 at the outer end of the seal 30 is formed between the housing flange 34 and the underside of the end plate 21. Adjacent the rotor post end a special circular angle bracket 35 is provided attached to the underside of the end plate 21 having a flange 36 spaced from the underside of the adjacent sector plate 21 to form the groove 37. Thus the radial seals on the upper edges of the partitions are supported just out of contact with the underside of the adjacent sector plate 21 so that up and down movement of the rotor shell may occur with respect to these sealing strips which at their lower ends extend into a groove 40 between the forward side of the partitions and a retainer strip 41. To carry the seals 30 around with the rotor, drive brackets 42 are provided. At the lower end of the rotor wearing shoes engaging in grooves on parts of the housing are not required because the lower radial seals 51 may rest by gravity against the lower end plate 21L. As shown in Figure 4 the lower radial seal leaf 51 may be provided with a wear shoe 52 contacting the end plate 21L. In Figure 5 the lower radial seal shoe 53 is mounted in the groove 54 between spaced retainer plates 55 attached to the lower edge of the partition and this seal also bears against the end plate 21L by gravity.

What we claim is:

1. In a regenerative air preheater or the like having a rotor made up of a cylindrical shell joined to a rotor post by radial partitions forming compartments that carry heat transfer material, and a housing surrounding the rotor and provided opposite the latter with end plates formed with circumferentially spaced apertures for the flow of heating gases and air to and through the regenerative material caried by the rotor; radial sealing members cooperating with the imperforate portions of said end plates comprising; sealing leaves separate from said radial partition freely mounted on the upper edges of said radial partitions and projecting axially of the rotor into the space between the rotor and said end plates with their radially extending edges held just out of contact with said end plates; means forming a circumferential track on one of said end plates guiding said sealing leaves axially of the rotor with respect to said partitions; and means mounted on said partitions and engaging with said sealing leaves for causing said sealing leaves to partake of the rotor movement.

2. In a regenerative air preheater or the like having a rotor made up of a cylindrical shell joined to a rotor post by radial partitions forming compartments that carry heat transfer material, and a housing surrounding the rotor and provided opposite the latter with end plates including imperforate portions located between circumferentially spaced apertures formed in said plates the flow of heating gases and air to and through the regenerative material carried by the rotor; radial sealing members cooperating with the imperforate portions of said plates comprising; sealing leaves freely mounted on the upper edges of said radial partitions and projecting axially of the rotor into the space between the rotor and said end plates with their radially extending edges just out of contact with said end plates; circumferential track means on one of said end plates guiding said sealing leaves axially of the rotor with respect to said partitions; means forming circumferential tracks on said housing adjacent the ends of the rotor; means mounted at the radially inner and outer ends of said sealing leaves engageable with said tracks for supporting said sealing leaves independently of said partitions and maintaining the outer radially extending surfaces of said sealing leaves in predetermined spaced relation to but out of contact with said end plates; and means attached to said partitions and engaging said sealing leaves for moving them along with said partitions during operation of said rotor.

WILLIAM E. HAMMOND.
JOHN A. LIDFORD.
CLAYTON A. BALLARD.

References Cited in the file of this patent

UNITED STATES PATENTS

| Number | Name | Date |
|---|---|---|
| 1,652,025 | Ljungstrom | Dec. 6, 1927 |
| 2,229,691 | Boestad | Jan. 28, 1941 |
| 2,287,777 | Boestad | June 30, 1942 |
| 2,471,995 | Yerrick et al. | May 31, 1949 |
| 2,517,512 | Tigges et al. | Aug. 1, 1950 |
| 2,549,656 | Yerrick et al. | Apr. 17, 1951 |

FOREIGN PATENTS

| Number | Country | Date |
|---|---|---|
| 500,682 | Great Britain | Feb. 14, 1939 |
| 634,627 | Great Britain | Mar. 22, 1950 |